United States Patent [19]

Tsukada

[11] Patent Number: 4,777,152

[45] Date of Patent: Oct. 11, 1988

[54] POROUS SILICON CARBIDE SINTER AND ITS PRODUCTION

[75] Inventor: Kiyotaka Tsukada, Oogaki, Japan

[73] Assignee: Ibiden Kabushiki Kaisha, Oogaki, Japan

[21] Appl. No.: 165,400

[22] Filed: Feb. 29, 1988

Related U.S. Application Data

[63] Continuation of Ser. No. 728,319, Apr. 29, 1985, abandoned.

[30] Foreign Application Priority Data

May 29, 1984 [JP] Japan ............... 59-109908

[51] Int. Cl.$^4$ ............ C04B 38/00; C04B 35/56; C04B 35/58
[52] U.S. Cl. ............ 501/80; 501/88; 423/345; 264/43; 264/65
[58] Field of Search ............ 264/43, 65; 423/345; 501/80, 88, 89, 91, 92

[56] References Cited

U.S. PATENT DOCUMENTS

| | | | |
|---|---|---|---|
| 2,941,962 | 6/1960 | Van der Beck | 501/88 |
| 2,964,823 | 12/1960 | Fredriksson | 501/88 |
| 4,209,478 | 6/1980 | Wooten et al. | 264/65 |
| 4,238,434 | 12/1980 | Enomoto et al. | 501/88 |
| 4,514,346 | 4/1985 | Luhleich et al. | 501/90 |
| 4,564,496 | 1/1986 | Gupta et al. | 501/88 |

OTHER PUBLICATIONS

Billington et al. "The Sintering of Silicon Carbide", In: Popper, P., Special Ceramics 1964 (New York, Academic Press, 1965), pp. 19-32.

*Primary Examiner*—Mark L. Bell
*Attorney, Agent, or Firm*—Balogh, Osann, Kramer, Dvorak, Genova & Traub

[57] ABSTRACT

A porous silicon carbide sinter and its production process, the sinter consisting mainly of silicon carbide and having a three-dimensional network structure composed mainly of silicon carbide plate crystals having an average aspect ratio of 3 to 50 and an average length along the direction of the major axis of 0.5 to 1,000 μm, wherein the open pores in the network structure have an average sectional area of 0.01 to 250,000 μm$^2$.

5 Claims, 2 Drawing Sheets

POROUS SILICON CARBIDE SINTER AND ITS PRODUCTION

This application is a continuation of application Ser. No. 728,319, filed Apr. 29, 1985, now abandoned.

BACKGROUND OF THE INVENTION

1. Field of the Invention

The present invention relates to a low-density, high-strength, gas-permeable, porous silicon carbide sinter, having a three-dimensional network structure comprising plate crystals of silicon carbide, and its production process. More particularly the present invention relates to a heat-resistant, corrosion-resistant, porous silicon carbide sinter which can be used suitably as a catalyst or catalyst support for chemical reactions, a material for a filter used in removing fine-particulate substances contained in high-temperature gases, or a material for heat exchangers, and its production process.

Silicon carbide has excellent chemical and physical properties such as excellent hardness, excellent abrasion resistance, excellent oxidation resistance, excellent corrosion resistance, good heat conductivity, low coefficient of thermal expansion, high thermal-shock resistance and high-temperature strength, and therefore it is a material which can be widely used as an abrasion-resistant material for mechanical seals and bearings, refractories of high-temperature furnaces, heat-resistant structural materials for heat exchangers, combustion tubes, etc., and corrosion-resistant materials for parts of a pump for strongly corrosive solutions of acids, alkalis, etc.

On the other hand, it is known that, by virtue of the above-mentioned properties of silicon carbide, a porous silicon carbide sinter comprising silicon carbide and gas-permeable pores, that is, open pores (hereinafter, referred to simply as pores) formed by crystals of silicon carbide can be used as a material which can be utilized in applications where the above-mentioned properties of silicon carbide are fully utilized, such as filters used in a high-temperature atmosphere, an oxidizing atmosphere, and/or a corrosive atmosphere, or a catalyst or catalyst support for exothermic oxidation reactions or chemical reactions at high-temperatures, and, for example, it is used as a filter for removing combustible fine-particulate substances, such as fine-particulate carbon contained in high-temperature gases such as exhaust gas from an internal combustion engine, especially, exhaust gas from a Diesel engine.

When the porous silicon carbide sinter is used as a filter such as the above-mentioned, it must have not merely heat resistance and corrosion resistance but also properties such as low permeation resistance to a fluid, an ability to remove foreign particles in high efficiency and a long period of endurance. On the other hand, when the porous silicon carbide sinter is used as a catalyst or a catalyst support or parts of a heat exchanger, it must satisfy requirements such as a high surface area for performing a chemical reaction, or a heat or material transfer effectively, and besides longterm stability of the surface.

2. Description of the Prior Art

Conventional processes for producing a porous silicon carbide sinter include (1) one comprising adding a binder such as a glass flux or clay to silicon carbide particles as an aggregate, molding the mixture and sintering the molding at a temperature at which the binder can melt, (2) one comprising mixing coarser silicon carbide particles with finer silicon carbide particles, molding the mixture, and sintering the molding at a temperature as high as above 2000° C., and (3) one disclosed in Japanese Patent Laid-Open No. 39515/1973, that is, "a process for producing a uniform porous recrystallized silicon carbide body, comprising adding a carbonaceous binder with or without carbon powder to silicon carbide powder, adding silicaceous powder in a theoretical amount necessary to react with the added carbon and free carbon formed from the binder during baking, molding the mixture, and thereafter heating the molding to 1,900° to 2,400° C. in a carbon powder to silicify the carbon in the molding".

The porous body produced by adding a glass flux or clay which serves as a binder in process (1) has a drawback that, because the binder melts at 1,000° to 1,400° C., the porous body is deformed in this temperature range, especially, near the glass transition point, and decreases markedly in its strength, with consequent limited applicability to fields which require both chemical and oxidation resistances.

On the other hand, the structure of the porous body produced by the above process (2) or (3), which is shown schematically in FIG. 3, is composed of a silicon carbide aggregate (A), a silicon carbide binder or a carbonaceous binder (B) which binds the aggregate particles together by coating and voids (C). The distribution of the voids, i.e., pores of the above porous body is determined substantially by the arrangement of aggregate particles during molding, and the porosity of the sinter is as low as 30 to 40%. Therefore, the permeation resistance of the porous body to a fluid is markedly high. On the other hand, when the porosity of the sinter is increased, there is a tendency that the number of contact points among aggregate particles is decreased, the strength of the porous body is decreased markedly, and the area of contact with a fluid is decreased markedly.

On the other hand, according to the process (2) or (3), the control of the pore diameter in the porous body is performed by blending aggregates of different particle sizes. According to these processes, in order to obtain a porous body having pores of a relatively large sectional area, an aggregate of a larger particle size is necessary and therefore the number of contact points among particles is reduced and the bonding strength of the particles is decreased, with a consequent decrease in the strength of the porous body. On the other hand, in order to obtain a porous body having pores of a relatively small sectional area, it is necessary to mold a mixture obtained by suitably blending coarser aggregate particles with medium aggregate particles and/or finer aggregate particles, and therefore there is a tendency that the porosity of the molding is decreased markedly and, in an extreme case, the pores are blocked. Therefore, the permeation resistance of such a porous body to a fluid is markedly high.

Further, with respect to porous sinters having pores of a relatively larger sectional area, Japanese Patent Laid-Open No. 122016/1983, for example, discloses a process for producing an electrically heat-generative silicon carbide filter, comprising impregnating a polymer foam material with a silicon carbide-based slurry, eliminating said polymer foam material by heat treatment to form a silicon carbide-based skeletal structure, subjecting said structure to the primary baking in argon gas at a temperature of 1,900° to 2,300° C., subjecting it to the secondary baking in nitrogen gas at a pressure of 1 to 200 atm and a temperature of 1,600° to 2,100° C., and forming a heat-resistant electrode on each end of the structure to make it possible to pass an electric current therethrough, and Japanese Patent Laid-Open No. 81905/1973 discloses a process for producing a porous ceramic material, comprising impregnating an organic foam with a slurry containing a finely divided organic material, drying the foam thus impregnated, and baking the dried product, wherein the foam is impregnated with the slurry, after it is treated so that the particulate material in the slurry may adhere to the surface of the foam structure.

Such porous bodies are composed of a cellular skeletons of various sizes, i.e., so-called skeletal structure, as shown in FIG. 4. Therefore, when the porous body is occupied by relatively large cellular skeleton (D), the porosity of the body is as high as 80 to 90% by volume, and permeation resistance is decreased but the strength is 10 to 15 kg/cm$^2$. Therefore, from the viewpoint of its practicality, the porous body has a drawback that it is relatively poor in mechanical strength and its area of contact with a fluid is markedly small. Further, according to these production processes, the pores which the polymer foam such as polyurethane constitutes tend to have a size of 100 $\mu$m or larger, and the formation of pores below 100 $\mu$m is very difficult in respect of the control of the expandability and dispersibility of a polymer and, in some cases, part of the open pores are turned into closed ones, or the diameters of open pores formed in the cell walls are small relative to the inside void volume, so that there is a drawback that the permeation resistance is too large to pass a fluid therethrough.

SUMMARY OF THE INVENTION

It is an object of the present invention to provide a porous silicon carbide sinter which is freed from the drawbacks of the above-mentioned prior art, that is, which has gas permeability toward the outside, an arbitrary pore diameter and an arbitrary porosity suitable for various applications, good mechanical strength and good permeation characteristics to a fluid and can function effectively in material transfer such as separation, adsorption, absorption, etc., of fluids, heat transfer, chemical reactions, etc., and its production process.

In order to attain the above object, the inventor of the present invention has molded a raw material composition consisting mainly of a silicon carbide powder, placing the molding in a sealed graphite crucible and sintered it at a temperature within the range of from 2,000° to 2,300° C. As a result, the inventor has found that it is possible to obtain a porous silicon carbide sinter having a network structure in which plate crystals of an extremely large aspect ratio are grown and, besides, has a high porosity, and completed a porous silicon carbide sinter having a three-dimensional network structure composed mainly of silicon carbide plate crystals having an average length along the direction of the major axis of 0.5 to 1,000 $\mu$m, and an average aspect ratio of 3 to 50, wherein the average sectional area of the open pores of the above network structure is 0.01 to 250,000 $\mu$m$^2$, and its production process.

DESCRIPTION OF THE PREFERRED EMBODIMENTS

Figure 1:
FIG. 1 is a scanning electron-microscope photograph (x 75) of the sintered body described in Example 1.

FIG. 1 is a scanning electron-microscope photograph (x 75) of the crystalline structure of one of the porous silicon carbide sinters according to the present invention. FIG. 1 clearly shows that the porous silicon carbide sinter of the present invention has a three-dimensional network structure composed of silicon carbide plate crystals entangled complicately in various directions, each of which has an aspect ratio of 10 to 20 and a length of about 500 $\mu$m and that the pores are ones which are continuous, non-linear and open but yet rich in gas permeability. By "the length of a silicon carbide plate crystal" herein used is meant the largest length (X) of an individual plate crystal, observed in an arbitrary cross-section of a sinter, and similarly, the aspect ratio (R) of an individual plate crystal is defined as a ratio of the above crystal length (X) to the largest thickness (Y) of a plate crystal, that is, $R = X/Y$.

Figure 3:
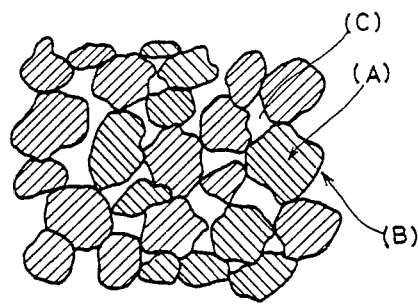
FIG. 3 is a schematic diagram showing the structure of a porous silicon carbide sinter produced by a conventional process.
Figure 4:
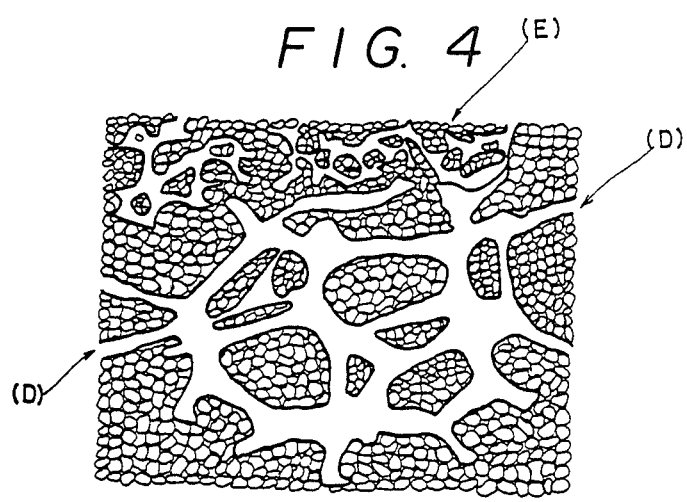
FIG. 4 is a schematic diagram showing the structure of a porous body having a skeletal structure.

The porous body of the present invention is characterized in that it has three-dimensional network structure composed of silicon carbide plate crystals of an average aspect ratio of 3 to 50. The reason why the porous body must have an average aspect ratio of 3 or greater is as follows. It is possible to obtain a porous body in which the pores constituted of the silicon carbide plate crystals occupy a larger volume as compared with that occupied by the crystals, that is, a porous body having a high porosity. As FIG. 3 shows, the structure of a conventional porous silicon carbide sinter is determined by the arrangement of aggregate particles during molding and, unlike the porous body of the present invention in which plate crystals are grown, it has an aspect ratio of at most about 2 and, therefore, does not have a high porosity or a large pore sectional area.

By the way, sinters having a structure in which plate crystals are grown relatively well are shown in, for example, U.S. Pat. No. 4,004,934 and Journal of the American Ceramic Society, Vol. 59, pp. 336-343(1976). However, the above sinters are relatively densified silicon carbide sinters, and the plate crystals thereof are those resulting from the densification. Therefore, they are quite different in structure from sinters in which only plate crystals are grown, such as the sinter of the present invention.

On the other hand, the reason why the porous body of the present invention must have an average aspect ratio of 50 or below is that a porous body composed of plate crystals having an average aspect ratio of 50 or above has a small number of contact points among crystals, so that the strength of the porous body itself is low. It is preferable that the average aspect ratio of the plate crystal is 5 to 30, and it is possible to select the average aspect ratio in the porous body of the present invention from the above range according to its use.

Further, it is necessary that the average length of the above plate crystal along the direction of its major axis is 0.5 to 1,000 $\mu$m. This is because, when the average length along the direction of the major axis is less than 0.5 $\mu$m, the pores formed by the plate crystals become small and, in some cases, part of the open pores are turned into closed ones and, so, the permeation resistance to a fluid is increased. On the other hand, when it is longer than 1,000 μm, the strength of the contact point among the plate crystals is reduced, so that the strength of the porous body itself is lowered. It is particularly preferable that the average length of the plate crystal along the direction of the major axis is 1 to 800 μm, and the average length in the porous body of the present invention can be selected from the above range according to its use.

Further, it is necessary that the average sectional area of open pores of the three-dimensional network structure is within the range of 0.01 to 250,000 μm². This is because, when the average sectional area of the open pores is less than 0.01 μm², the permeation resistance to a fluid is decreased, while when the average sectional area of the open pores exceeds 250,000 μm², the strength of the porous body itself is lowered. It is particularly preferable that the average sectional area of the open pores of the network structure is within the range of from 0.25 to 90,000 μm², and it is possible to select the average sectional area of the pores of the porous body of the present invention from the above range according to its use.

Further, it is preferable that the plate crystals having an aspect ratio of 3 to 30 amount to at least 20 parts by weight of 100 parts by weight of the crystals of the porous body. The content of the plate crystals can be determined by the analysis of a photograph of the structure of crystals. The reason why it is preferable that the plate crystals having an aspect ratio of 3 to 50 amount to at least 20 parts by weight of 100 parts by weight of said porous body is as follows. When the plate crystals are present in an amount smaller than 20 parts by weight, which means that the silicon carbide crystals having a smaller aspect ratio are contained in a larger amount, the permeation resistance to a fluid is increased. It is particularly advantageous that the plate crystals amount to at least 40 parts by weight of 100 parts by weight of the crystals of the porous body.

Further, it is preferable that the open pore rate in said porous silicon carbide sinter is 20 to 95% by volume, based on the total volume of the sinter. This is because when this rate is smaller than 20% by volume, part of the open pores are turned into closed ones, the permeation resistance of the sinter to a fluid is increased, and the area of contact with a fluid is decreased. On the contrary, when it is larger than 95% by volume, the area of contact with a fluid is increased, but the strength of the porous sinter is decreased instead, which makes its use difficult. It is particularly advantageous that the open pore rate of the body is 30 to 90% by volume, based on the total volume of the sinter, for applications such as heat-resistant structural materials, heat exchangers, and filters.

Further, it is preferable that the specific surface area of the silicon carbide sinter is at least 0.05 m²/g. The specific surface area is a value determined by nitrogen adsorption according to the BET method. The reason why it is preferable that the specific surface area is at least 0.05 m²/g is that, in applications such as heat exchangers, catalyst supports, or adsorbents, a larger area of contact between a sinter and a fluid is preferred. It is the most desirable for these applications that the specific surface area is at least 0.2 m²/g.

It is also known that the porous silicon carbide sinter can be endowed with abrasion resistance or sliding property by filling its open pores with metallic silicon or a resin and used as a sliding material or a jig, or after being formed into a honeycomb, it is used as a high-efficiency heat exchanger or a catalyst support.

The process for producing a porous silicon carbide sinter of the present invention will now be described in detail.

According to the present invention, it is possible to obtain a porous silicon carbide sinter having a three-dimensional network structure composed mainly of silicon carbide plate crystals having an average length along the direction of the major axis of 10 to 1,000 μm and an average aspect ratio of 3 to 50, wherein the open pores of said network structure has an average sectional area within the range of from 400 to 250,000 μm², by the following steps (a) and (b):

(a) a step of molding a silicon carbide powder having an average particle diameter of 10 μm or below, the powder containing at least 60% by weight of β-form, 2H-form and amorphous silicon carbides, and (b) a step of baking the molding obtained in step (a) at a temperature within the range of from 1,900° to 2,300° C., while preventing the silicon carbide from being evaporated.

According to the present invention, it is necessary that the starting material is one containing silicon carbide containing at least 60% by weight of β-form, 2H-form and amorphous silicon carbides. This is because, β-form, 2H-form and amorphous silicon carbides are low-temperature stable forms which are synthesized at relatively low temperatures, so that they partially undergo, when baked, phase transfer to high-temperature stable α-form crystals such as 4H-, 6H- or 15 R-forms and easily form plate crystals and, besides, they can exhibit excellent properties in the growth of crystals and, especially when a starting material comprising at least 60% by weight of β-form silicon carbide is used, it is possible to produce the porous body aimed in the present invention. It is particularly preferable to use a starting material containing at least 70% by weight of βform, 2H-form and amorphous silicon carbides.

It is also necessary that the starting material is in the form of a fine powder of an average particle diameter of 10 μm or below. When the powder has such an average particle diameter, the number of points of contact among particles are relatively large, the thermal activity is large at the baking temperature of silicon carbide, and the transfer of atoms among silicon carbide particles is extremely remarkable, so that the bonding among silicon particles is apt to occur very easily. Therefore, the growth of plate crystals is remarkable. Especially, when the average particle diameter of the starting material is 5 μm or below, a desirable result can be obtained with respect to the growth of plate crystals.

Methods for molding said starting material into a molding of a desired shape include various conventional ones and, for example, pressure molding, casting, and injection molding can be used advantageously.

It is also necessary that the molding having a desired shape is baked at a temperature within the range of from 1,900° to 2,300° C. under a condition under which the evaporation of silicon carbide produced from the molding during baking can be fully prevented, because it becomes possible thereby to accelerate the bonding among adjacent SiC particles and the growth of plate crystals. The reason why, as mentioned above, it is possible to accelerate the bonding among adjacent SiC particles and the growth of plate crystals by carrying out the baking under a condition under which the evaporation of SiC is fully prevented is considered to be that it becomes possible thereby to accelerate the transfer between silicon carbide particles by evaporation, recondensation, and/or surface diffusion of silicon carbide.

It is also necessary that the silicon carbide molding obtained by molding the above starting material into a desired shape is placed in a heat-resistant vessel made of, for example, graphite or silicon carbide, and baked at a temperature within the range of from 1,900° to 2,300° C. while preventing the external air from entering the vessel. This is because it becomes possible thereby to join adjacent silicon carbide crystals together by fusing and to accelerate the growth of plate crystals. The reason why it is possible to join adjacent silicon carbide crystals together by fusing and to accelerate the growth of plate crystals by placing the molding in a heat-resistant vessel and baking it while preventing the external air from entering the vessel is considered to be that it becomes possible thereby to accelerate the transfer of silicon carbide atoms among silicon carbide particles by evaporation-recondensation and/or surface diffusion. On the other hand, according to the conventional sintering processes such as normal-pressure sintering, sintering underr pressure of an ambient gas or sintering in vacuum, the growth of plate crystals was difficult and, besides, the points of contact among silicon carbide particles had a neck-like constricted shape, so that the strength of the sinters were reduced.

The preferred methods for carrying out the baking while fully preventing the evaporation of SiC include a method for baking a molding placed in a heat-resistant vessel which can prevent the external air from entering, made of, for example, graphite, silicon carbide, tungsten carbide, molybdenum or molybdenum carbide.

According to the present invention, it is preferable that the molding is baked while the amount of SiC evaporated is controlled to 5 wt.% or below.

In order to obtain a porous body having open pores of a relatively large average sectional area in the production of the porous body of the present invention, it is preferable that the baking is carried out at a relatively low rate of temperature rise during baking, the maximum temperature is relatively high, and/or the holding time at the maximum temperature is long. According to these requirements, it is possible to allow the individual silicon carbide plate crystals to grow to a larger size and, as a consequence, to obtain a porous body having a large sectional area of a pore.

On the other hand, in order to obtain a porous body having open pores of a relatively small average sectional area in the production of the porous body of the present invention, it is preferable that the rate of temperature increase during baking is relatively high, the maximum temperature is relatively low, and/or the holding time at the maximum temperature is short. This is because the individual silicon carbide plate crystals can not grow to a greater extent under these conditions.

According to the present invention, it is necessary that the baking is carried out at a temperature within the range of from 1,900° to 2,300° C. This is because when the baking temperature is lower than 1,900° C., the growth of particles is insufficient so that it is difficult to obtain a porous body of a high strength, while when the baking temperature is higher than 2,300° C., the sublimation of silicon carbide becomes active, so that the grown plate crystals will get lean instead and it becomes difficult to obtain a porous body having a high strength.

It is particularly preferable that the baking is carried out at a temperature within the range of 1,950° to 2,250° C.

According to the present invention, it is possible to obtain a porous silicon carbide sinter having a three-dimensional network structure mainly composed of silicon carbide plate crystals having an average length along the direction of the major axis of 0.5 to 200 $\mu$m, and an average aspect ratio of 3 to 50, wherein the open pores in the network structure have an average sectional area within the range of from 0.01 to 10,000 $\mu$m$^2$, by the following steps (a), (b), and (c):

(a) a step of uniformly mixing 100 parts by weight of a starting material comprising a silicon carbide powder having an average particle diameter of 10 $\mu$m or below and consisting of $\alpha$-form, $\beta$-form and/or amorphous silicon carbides and inevitable impurities, with 10 parts by weight or below of at least one member selected from the group consisting of aluminum, aluminum diboride, aluminum carbide, aluminum nitride, aluminum oxide, boron, boron carbide, boron nitride, boron oxide, calcium oxide, calcium carbide, chromium, chromium boride, chromium nitride, chromium oxide, iron, iron carbide, iron oxide, lanthanum boride, lanthanum oxide, lithium oxide, silicon, silicon nitride, titanium, titanium oxide, titanium dioxide, titanium trioxide, and yttrium oxide, (b) a step of molding the mixture obtained in step (a), and (c) a step of baking the molding obtained in step (b) at a temperature within the range of from 1,700° to 2,300° C., while preventing the silicon carbide from being evaporated.

According to the present invention, it is necessary that the starting materials are in the form of a fine powder having an average particle diameter of 10 $\mu$m or below. When the powder has such an average particle diameter, the number of points of contact among particles are relatively large, the thermal activity is large at the baking temperature of silicon carbide, and the transfer of atoms among silicon carbide particles is extremely remarkable, so that the bonding among silicon particles are apt to occur very easily. Therefore, the growth of plate crystals is remarkable. Especially, when the average particle diameter of said starting material is 5 $\mu$m or below, a desirable result can be obtained with respect to the growth of plate crystals.

According to the present invention, it is necessary to add at least one member selected from the group consisting of aluminum, aluminum diboride, aluminum carbide, aluminum nitride, aluminum oxide, boron, boron carbide, boron nitride, boron oxide, calcium oxide, calcium carbide, chromium, chromium boride, chromium nitride, chromium oxide, iron, iron carbide, ferric oxide, lanthanum boride, lanthanum oxide, lithium oxide, silicon, silicon nitride, titanium, titanium oxide, titanium dioxide, titanium trioxide, and yttrium oxide. The above substances have a function of markedly enhancing the growth rate of silicon carbide crystals. These substances are added because their vapors and/or vapors of their decomposition products are generated at the baking temperature, i.e., 1,700° to 2,300° C., of said silicon carbide molding, these vapors are diffused into the entire silicon carbide molding to form an extremely large number of nuclide of plate crystals, the growth of plate crystals occur around each nucleus, and as a result, the sizes of the formed plate crystals are limited to form a three-dimensional network structure of a fine texture. Among the above substances, boron, boron carbide, boron nitride, aluminum oxide, aluminum nitride, iron, aluminum carbide, aluminum diboride and aluminum can be used particularly advantageously.

It is necessary that the amount of said substance added is 10 parts by weight or below per 100 parts by weight of the starting material based on silicon carbide, because when the substance is added in an amount larger than 10 parts by weight, the partial vapor pressure of the substance or of its decomposition product can vary little within the range of the baking temperature of the silicon carbide molding. The properties inherent in silicon carbide are lost because the amount of the substance remaining in said molding increases instead. The amount of said substance suited for the growth of plate crystals is preferably 5 parts by weight or below per 100 parts by weight of the silicon carbide starting material.

Examples of the silicon carbide which can be used as said starting material include any of α-form, β-form, and/or amorphous silicon carbides.

According to the present invention, it is possible to add a carbon source which can leave free carbon during baking. The carbon sources include any of substances which exist in the form of carbon at the start of sintering. For example, a variety of organic substances such as phenolic resins, lignosulfonates, polyvinyl alcohol, corn starch, molasses, coal tar pitch, and alginates, and pyrolytic carbons such as carbon black or acetylene black can be used advantageously.

When the free carbon is present together with the above substance, it can prevent the growth of crystals and allow one to obtain fine silicon carbide plate crystals, so that it is effective in obtaining a porous body having fine pores.

It is also advantageous that said free carbon is present in an amount of 5 parts by weight or below per 100 parts by weight of the starting material, because even when it is added in an amount larger than 5 parts by weight, its effect is no more enhanced and the amount of free carbon remaining in said porous body increases instead to prevent bonding among particles, which leads to degradation of the strength of the porous body. If is effective to add the free carbon in an amount of 3 parts by weight or below.

According to the present invention, methods for baking a molding while fully preventing SiC from being evaporated include a process for baking a molding placed in a heat-resistant vessel which can prevent the external air from entering, made of at least one member selected, for example, from the group consisting of graphite, silicon carbide, aluminum nitride, zirconium oxide, tungsten carbide, titanium carbide, magnesium oxide, molybdenum carbide, molybdenum, tantalum oxide, tantalum, zirconium carbide, and graphite-silicon carbide composite.

Such a vessel does not melt and can retain its shape at a temperature within the range of the baking temperature and is effective in preventing vapors of the additive and/or vapor of its decomposition product from leaking from the system and in broadly diffusing the effect of the additive into the entire silicon carbide molding. Above all, graphite, silicon carbide, graphite-silicon carbide composite, tungsten carbide, aluminum nitride, titanium carbide, molybdenum, and molybdenum carbide can be used effectively.

In order to obtain a porous body having open pores of a relatively large average sectional area in the production of the porous body of the present invention, it is preferable that the rate of temperature rise during baking is relatively low, the maximum temperature is relatively high, and/or the holding time at the maximum temperature is long. This is because the individual silicon carbide plate crystals can grow to a greater extend under these conditions, so that a porous body having open pores of a large sectional area can be obtained.

On the other hand, in order to obtain a porous body having open pores of a relatively small average sectional area in the production of the porous body of the present invention, it is preferable that the rate of temperature rise during baking is relatively high, the maximum temperature is relatively low, and/or the holding time at the maximum temperature is short. This is because the individual silicon carbide plate crystals can not grow to a greater extent under these conditions.

According to the present invention, it is necessary that the baking is carried out at a temperature within the range of from 1,700° to 2,300° C., because when the baking temperature is lower than 1,700° C., the growth of particles is insufficient, so that it is difficult to obtain a porous body of a high strength.

Th present invention will now be described in detail with reference to examples and comparative examples.

EXAMPLE 1

Fine silicon carbide powder used as a starting material composed of 94.6% by weight of β-form crystals and the balance substantially of 2H form crystals, mainly contained 0.39% by weight of free carbon, 0.17% by weight of oxygen, 0.03% by weight of iron and 0.03% by weight of aluminum and had an average particle diameter of 0.28 μm.

5 parts by weight of polyvinyl alcohol and 300 parts by weight of water were added to 100 parts by weight of the above silicon carbide fine powder, and the mixture was blended in a ball mill for 5 hours and dried.

A portion in a suitable amount was taken from the dried mixture, granulated and then molded by using a metallic force plunger at a pressure of 50 kg/cm$^2$. The formed molding had a density of 1.2 g/cm$^3$ and a dry weight of 21 g.

The above molding was placed in a 50-ml graphite vessel which could prevent the external air from entering, and baked in an atmosphere of argon gas at 1 atm by using a Tammann-type baking furnace.

The molding was baked by heating it to 2,200° C. at a rate of 2.5° C./min, and keeping it at the maximum temperature of 2,200° C. for 6 hours.

The obtained sinter weighed 19.6 g and had a crystal structure which, as shown in a scanning electron-microscope photograph (x 75) in FIG. 1, was a three-dimensional structure in which plate crystals of an average aspect ratio of 12 and an average length along the direction of the major axis of 380 μm were entangled complicatedly in various directions. The content of plate crystals of an aspect ratio of 3 to 50 was 98% based on the total weight of the porous body. The pores of the porous body were nonlinear open pores, the open pores accounted for 64% of the total volume, and the specific surface area was 1.2 m$^2$/g.

The bending strength of this sinter was as high as 180 kg/cm$^2$, and the air permeability characteristics of this porous body were measured by using a test piece of a wall thickness of 5 mm and passing air at 20° C. therethrough at a flow rate of 1 m/sec. The pressure loss was 480 mmH$_2$O or below.

COMPARATIVE EXAMPLE 1

This experiment was carried out in the same manner as in Example 1, except that the molding was not placed in a graphite vessel but subjected as such to normal pressure sintering in an atmosphere of argon. 18.8 g of a sinter was obtained. Its crystal structure was one consisting of nearly particulate silicon carbide of an average aspect ratio of 1.8 and an average length along the direction of the major axis of 30 μm. The rate of open pores of this sinter was 67% by volume based on the total volume, but the bending strength was 4 kg/cm², which was markedly low.

EXAMPLES 2 AND 3

These experiments were carried out in the same manner as in Example 1, except that the moldings formed at molding pressure of 3,000 kg/cm² and 10 kg/cm², respectively, were baked after they had been placed in a tungsten carbide vessel and a silicon carbide (theoretical density of 95%) vessel, respectively. Table 1 shows the results.

EXAMPLE 4 AND COMPARATIVE EXAMPLE 2

Porous sinters were produced by carrying out these experiments in the same manner as in Example 1, except that silicon carbide powders each formed by blending the silicon carbide powder as used in Example 1 with an α-form silicon carbide powder in a blending ratio shown in Table 2 were used. The above α-form silicon carbide powder was one prepared by grinding a commercially available α-form silicon carbide (GC #3000) and further purifying and classifying the product, containing 0.4% by weight of free carbon and 0.13% by weight of oxygen and having an average particle diameter of 8.4 μm.

TABLE 2

| | Blending ratio (wt. %) α-form | Blending ratio (wt. %) β-form | Average aspect ratio | Average length along direction of major axis (μm) | Average sectional area of open pore (μm²) | Content of plate crystal (wt. %) | Rate of open pores (vol. %) | Specific surface area (m²/g) | Pressure loss (mmH₂O) |
| --- | --- | --- | --- | --- | --- | --- | --- | --- | --- |
| Example 4 | 70 | 30 | 6 | 130 | 5600 | 73 | 60 | 0.8 | 710 |
| Comparative Example 1 | 52 | 48 | 2.3 | 9 | 32 | 18 | 52 | 0.08 | 10120 |

EXAMPLES 5 AND 6

Porous silicon carbide sinters were produced by carrying out these experiments in the same manner as in Example 1, except that rates of temperature increase, maximum baking temperatures, and holding times at maximum temperatures as shown in Table 3 were used.

TABLE 3

| Example | Rate of temperature increase (°C./min) | Maximum sintering temperature (°C.) | Holding time at maximum temperature (°C.) | Average aspect ratio | Average length along direction of major axis (μm) | Average sectional area of open pore (μm²) | Content of plate crystal (wt. %) | Rate of open pores (vol. %) | Specific surface area (m²/g) |
| --- | --- | --- | --- | --- | --- | --- | --- | --- | --- |
| 5 | 0.5 | 2230 | 12 | 19 | 470 | 11300 | 99 | 67 | 1.3 |
| 6 | 10 | 2000 | 1 | 5 | 22 | 480 | 58 | 63 | 8.5 |

EXAMPLE 7

The fine silicon carbide powder used as a starting material composed of 94.6% by weight of β-form crystals and the balance substantially of 2H-form crystals, mainly contained 0.89% by weight of free carbon, 0.17% by weight of oxygen, 0.03% by weight of iron, and 0.03% by weight of aluminum, and had an average particle diameter of 0.28 μm.

100 parts by weight of the above fine silicon carbide powder was mixed with 0.3 part by weight of amorphous boron and a binder consisting of 1 part by weight of polyethylene glycol, 4 parts by weight of polyacrylate ester, and 100 parts by weight of benzene, and the mixture was milled in a ball mill for 20 hours, and dried.

A portion in a suitable amount was taken from the dried mixture, granulated, and molded at a pressure of 50 kg/cm² by using a metallic force plunger. This molding had a density of 1.2 g/cm³ and a dry weight of 21 g.

The above molding was placed in a 50 ml graphite vessel which could prevent the external air from entering and baked in an atmosphere of argon gas at 1 atm by using a Tammann-type baking furnace.

TABLE 1

| Example | Molding pressure (kg/cm²) | Baking vessel | Average aspect ratio | Average length along direction of major axis (μm) | Average sectional area of open pore (μm²) | Content of plate crystal (wt. %) | Rate of open pores (vol. %) | Specific surface area (m²/g) | Bending strength (kg/cm²) | Pressure loss (mmH₂O) |
| --- | --- | --- | --- | --- | --- | --- | --- | --- | --- | --- |
| 2 | 3000 | tungsten carbide | 9 | 90 | 6400 | 92 | 40 | 0.7 | 980 | 2500 |
| 3 | 10 | 95% TD SiC | 20 | 540 | 158000 | 99 | 82 | 1.7 | 220 | 40 |

The molding was baked by heating it to 2,100° C. at a rate of 5° C./min and holding it at the maximum temperature of 2,100° C. for 4 hours.

Figure 2:
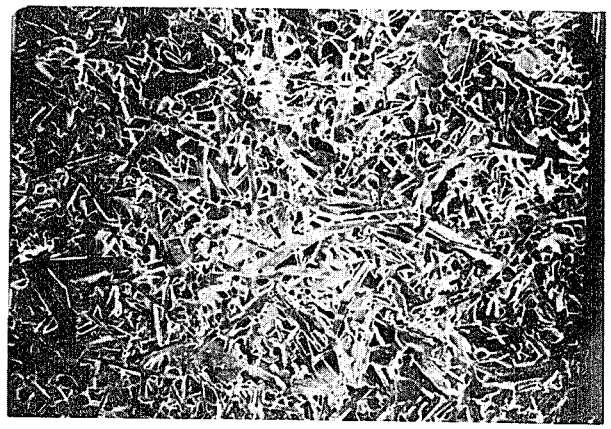
FIG. 2 is that (x 500) of the sintered body described in Example 7.

The obtained sinter had a crystal structure which, as shown in a scanning electron-microscope photograph (× 500) in FIG. 2, was a three-dimensional structure in which plate crystals of an average aspect ratio of 10 and an average length along the direction of the major axis of 13 μm were entangled complicatedly in various directions. The content of plate crystals of an aspect ratio of 5 to 50 was 96%, based on the total weight of the porous body. The pores of the porous body were nonlinear open pores, the open pores accounted for 61% of the total volume, and the specific surface area was 3.8 m²/g.

The bending strength of this sinter was as high as 2,370 kg/cm², and the air permeability characteristics of this porous body were measured by using a test piece of a wall thickness of 5 mm and passing air at 20° C. therethrough at a flow rate of 1 m/sec. The pressure loss was 730 mm H₂O or below.

EXAMPLE 8

Porous sinters were produced by carrying out this experiment in the same manner as in Example 7, except that the amorphous boron used as an additive was replaced with aluminum, aluminum diboride, aluminum carbide, aluminum nitride, aluminum oxide, boron carbide, boron nitride, boron oxide, calcium oxide, calcium carbide, chromium, chromium boride, chromium nitride, chromium oxide, iron, iron carbide, iron oxide, lanthanum boride, lanthanum oxide, lithium oxide, silicon, silicon nitride, titanium, titanium oxide, titanium dioxide, titanium trioxide, or yttrium oxide. All of the produced silicon carbide sinters had a crystalline structure in which plate crystals were grown well, and were extremely excellent in bending strength, permeability characteristics, etc.

As mentioned above, the porous silicon carbide sinter according to the present invention which is endowed with a uniform aspect ratio, a uniform pore diameter, etc., by the control of an atmosphere can give a more precise separation efficiency to various filters, dust collectors, or classifiers, and makes it possible to make a uniform and precise control in fields of catalysts and catalyst supports in the chemical industry, heat exchangers and so on.

What is claimed is:

1. A porous silicon carbide sinter comprising a sinter based on silicon carbide, which has a three dimensional network structure mainly composed of silicon carbide plate crystals of an average aspect ratio of 3 to 50 and an average length along the direction of the major axis of 0.5 to 1000 μm, said network structure having an average sectional area of open pores of 0.01 to 250,000 μm², the open pore range of said three dimensional network being 20 to 95% by volume, based on the total volume, said plate crystals accounting for at least 20 parts by weight of 100 parts by weight of said porous silicon carbide sinter, and the specific surface area of said sinter is at least 0.05 m²/g.

2. A process for producing a porous silicon carbide sinter having a three-dimensional network structure composed mainly of silicon carbide plate crystals having an average length along the direction of the major axis of 10 to 1,000 μm and an average aspect ratio of to 3 to 50, wherein the open pores of said network have an average sectional area within the range of from 400 to 250,000 μm², the open pore range of said three-dimensional network being 20 to 95% by volume based on the total volume, and said plate crystals accounting for at least 20 parts by weight of 100 parts by weight of said porous silicon carbide sinter, comprising a sequence of the following steps (a) and (b):

(a) a step of molding a silicon carbide powder having an average particle diameter of 10 μm or below and containing at least 60% by weight of β form, 2H-form and amorphous silicon carbides into a desired shape, and (b) a step of baking the molding obtained in step (a) at a temperature within the range of from 1,900° to 2,300° C. in a heat-resistant vessel which can prevent the external air from entering while preventing the silicon carbide from being evaporated.

3. A process according to claim 2, wherein the baking in step (b) is carried out by controlling the amount of silicon carbide evaporated to 5% by weight or below.

4. A process for producing a porous silicon carbide sinter having a three-dimensional network structure composed mainly of silicon carbide plate crystals having an average length along the direction of major axis of 0.5 to 200 μm and an average aspect ratio of to 3 to 50, wherein the open pores of said network structure have an average sectional area within the range of from 0.01 to 10,000 μm, the open pore range of said three-dimensional network being 20 to 95% by volume based on the total volume, and said plate crystals accounting for at least 20 parts by weight of 100 parts by weight of said porous silicon carbide sinter, comprising a sequence of the following steps (a) to (c):

(a) a step of uniformly mixing 100 parts by weight of a starting material, said starting material comprising a silicon carbide powder having an average particle diameter of 10 μm or below and consisting of α-form, β-form and amorphous silicon carbides and inevitable impurities with 10 parts by weight or below of at least one member selected from the group consisting of aluminum, aluminum diboride, aluminum carbide, aluminum nitride, aluminum oxide, boron, boron carbide, boron nitride, boron oxide, calcium oxide, calcium carbide, chromium, chromium boride, chromium nitride, chromium oxide, iron, iron carbide, iron oxide, lanthanum boride, lanthanum oxide, lithum oxide, silicon, silicon nitride, titanium, titanium oxide, titanium dioxide, titanium trioxide, and yttrium oxide;

(b) a step of molding the mixture obtained in step (a); and (c) a step of baking the molding obtained in step (b) at a temperature within the range of from 1,700° to 2,300° C. in a heat-resistant vessel which can prevent the external air from entering while preventing the silicon carbide from being evaporated.

5. A process according to claim 4, wherein the baking in step (c) is carried out by controlling the amount of silicon carbide evaporated to 5% by weight or below.

* * * * *